(12) United States Patent
Hsu

(10) Patent No.: US 6,798,646 B2
(45) Date of Patent: Sep. 28, 2004

(54) ROTARY AXLE STRUCTURE FOR PORTABLE COMPUTERS

(75) Inventor: Chen-Hua Hsu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 44 days.

(21) Appl. No.: 10/366,386

(22) Filed: Feb. 14, 2003

(65) Prior Publication Data

US 2004/0160733 A1 Aug. 19, 2004

(51) Int. Cl.⁷ .................................................. G06F 1/16
(52) U.S. Cl. ........................ 361/681; 361/683; 345/156; 278/176.3
(58) Field of Search .................................. 361/681, 683, 361/682, 679, 724–727; 345/168, 169, 905, 156; 248/917–923, 924, 176.3; 16/235, 308, 366, 368, 367, 342; 403/53, 57; 74/490.05, 490.06; 341/22; 364/708.1; 400/489, 682, 691, 693; 312/208.1, 208.4

(56) References Cited

U.S. PATENT DOCUMENTS

| | | | | |
|---|---|---|---|---|
| 5,016,849 A | * | 5/1991 | Wu | 248/176.3 |
| 5,206,790 A | * | 4/1993 | Thomas et al. | 361/681 |
| 5,335,142 A | * | 8/1994 | Anderson | 361/681 |
| 6,141,208 A | | 10/2000 | Hong et al. | |
| 6,189,842 B1 | | 2/2001 | Bergeron Gull et al. | |
| 6,275,376 B1 | * | 8/2001 | Moon | 361/683 |
| 6,347,433 B1 | * | 2/2002 | Novin et al. | 16/367 |
| 6,392,871 B1 | | 5/2002 | Yanase | |
| 6,498,721 B1 | * | 12/2002 | Kim | 361/681 |
| 6,549,789 B1 | * | 4/2003 | Kfoury | 455/550.1 |
| 6,587,333 B2 | * | 7/2003 | Tseng et al. | 361/681 |
| 6,654,233 B2 | * | 11/2003 | Tseng et al. | 361/681 |
| 2003/0052857 A1 | * | 3/2003 | Pappas | 345/156 |
| 2004/0012920 A1 | * | 1/2004 | Tanimoto et al. | 361/683 |
| 2004/0107540 A1 | * | 6/2004 | Hsu | 16/366 |

FOREIGN PATENT DOCUMENTS

| | | | | | |
|---|---|---|---|---|---|
| JP | 405119867 A | * | 5/1993 | | G06F/1/16 |
| JP | 405242040 A | * | 9/1993 | | G06F/15/02 |

* cited by examiner

Primary Examiner—Michael Datskovsky
(74) Attorney, Agent, or Firm—Birch, Stewart, Kolasch & Birch, LLP

(57) ABSTRACT

A rotary axle structure for portable computers mainly includes a member with an indented notch formed on the surface thereof and a sloped element with an elevation higher than the surface of the indented notch. The display device of a portable computer has a pivotal shalt located on the surface of the member. When the display device is lifted and turned about the first axis, the pivotal shaft may be lowered in the indented notch or be lifted to the sloped element to alter the distance between a leaning element in the first axis and the main body so that the display device may be lifted and moved away from the main body. Thus the display device may be swiveled without scraping the computer main body or the bottom of the display device.

15 Claims, 10 Drawing Sheets

US 6,798,646 B2

ROTARY AXLE STRUCTURE FOR PORTABLE COMPUTERS

FIELD OF THE INVENTION

The invention relates to a rotary axle structure for portable computers and particularly to a rotary axle structure that allows the display device to be flipped open relative to the main body and be swiveled without scrapping the surface of the main body, and allows the display device to be folded closely over the main body.

BACKGROUND OF THE INVENTION

Over the years many products and patents have been developed and disclosed for portable computers. To increase the convenience of utilization, these days some portable computers have features that allow the display device to be swiveled relative to the main body.

FIG. 1 illustrates a conventional rotary axle 11 that has a turnable swivel means with a pivotal shaft engaged thereon. The pivotal shaft allows the display device 1 to be opened relative to the main body 2, while the swivel allows the display device 1 to be swiveled relative to the main body 2. The rotary axle 11 thus constructed is not very stable. When the display device 1 is opened and swiveled relative to the main body 2, the bottom side of the display device 1 often forms a contact frictional area 21 on the surface of the main body 21. Hence the swiveling of the display device 1 is prone to incur a scraping damage on the surface of the main body 2 and spoils the appearance of the main body 2. In serious occasions the swiveling display device 1 even hits or jams the button keys located on the surface of the main body 2 and causes scrapes, faulty pressing of the button keys and rough swiveling.

In order to prevent the aforesaid disadvantages, some venders have introduced an improved swivel axle. FIG. 2 shows one of the examples. It has an extended swivel axle 12 which may raise the elevation of the display device 1. While such a design enables the display device 1 to be opened and swiveled without the problems set forth above, the extended swivel axle 12 forms a gap 22 with the main body 2 when closed. As a result, the display device 1 and the main body 2 are easily contaminated.

In view of the foregoing concerns, it's important to design a swivel axle structure for portable computers that enables the display device to swivel without scraping the surface of the main body and the display device, and avoid hitting the button keys or forming a gap between the display device and the main body when folded to eliminate contamination.

SUMMARY OF THE INVENTION

The primary object of the invention is to provide a swivel axle structure for portable computers enabling the display device to be swiveled without scraping the surfaces of the main body and the display device, or hitting the button keys.

The swivel axle structure of the invention is for portable computers that have a display device and a main body. The swivel axle structure includes a pivotal shaft turnable in the direction of a first axis and a swivel apparatus swivelable in the direction of a second axis. The pivotal shaft is located on the display device and has two leaning elements (leaning sections). The swivel apparatus is located on the main body and includes a first component, a second component, an elastic element and a third component. The first component includes two lugs and a strut. The lugs are located on one end of the first component to couple with the pivotal shaft. The strut is located on another end of the first component. The second component is located on the main body and is coupled on the strut, and has a swivel edge on one end. The swivel edge has two indented notches and a sloped element (to provide a lifting path) corresponding to the leaning elements. The elastic element is coupled with the strut and has one end in contact with the second component. The third component is coupled on the strut and fastened to the first component, and is connected to another end of the elastic element.

When in use, lift and open the display device relative to the main body, and turn the leaning elements along the indented notches to swivel the display device. The leaning elements can be lifted to the sloped element and avoid the indented notches. In the mean time, the first component and the third component are lifted upwards relative to the second component. The elastic element harnesses the first component to connect the leaning elements to the swivel edge. Thus when the display device is swiveled, it is lifted upwards and moved away from the main body. In other words, the leaning elements move on the sloped element to alter the distance between the leaning element in the direction of the first axis and the main body.

1. The invention has the following effects: When the display device is swiveled, it does not scrape the surface of the main body or the display-bottom, and button keys are not pressed.
2. When the display device is folded over the main body, there is no gap between the two. Thus contamination is eliminated.
3. By providing a retaining element and the design of an axle hole of the second component, cables can be disposed inside the axle hole without rupture, caused by over-swiveling of the display device.
4. The elastic element can prevent the display device from loosening or wobbling during swiveling.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
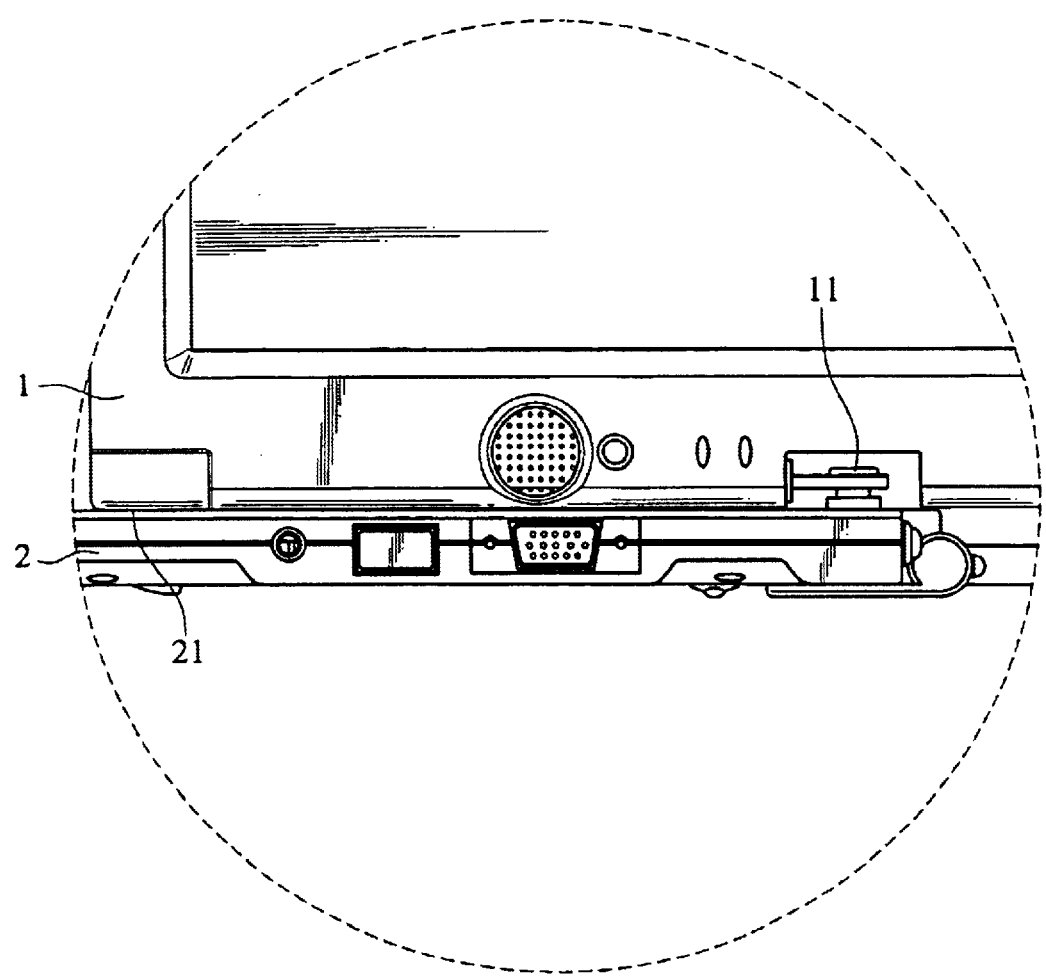
FIG. 1 is a schematic view of a conventional technique for a swivel axle.
Figure 2:
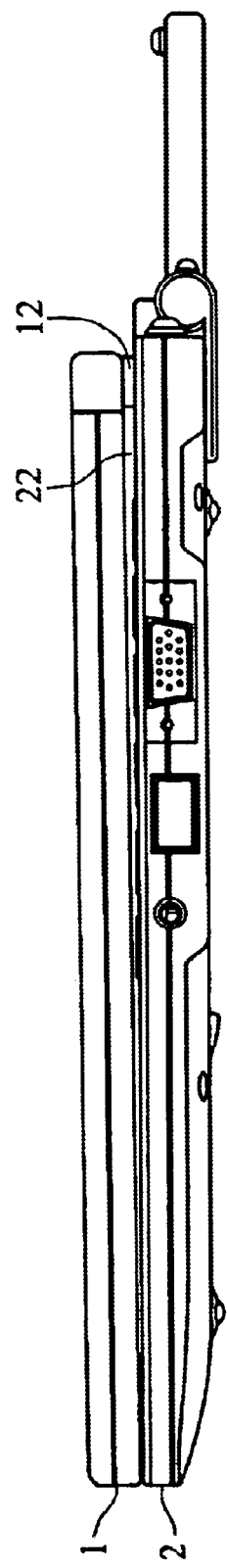
FIG. 2 is a schematic view of anther conventional technique for a swivel axle.
Figure 3:
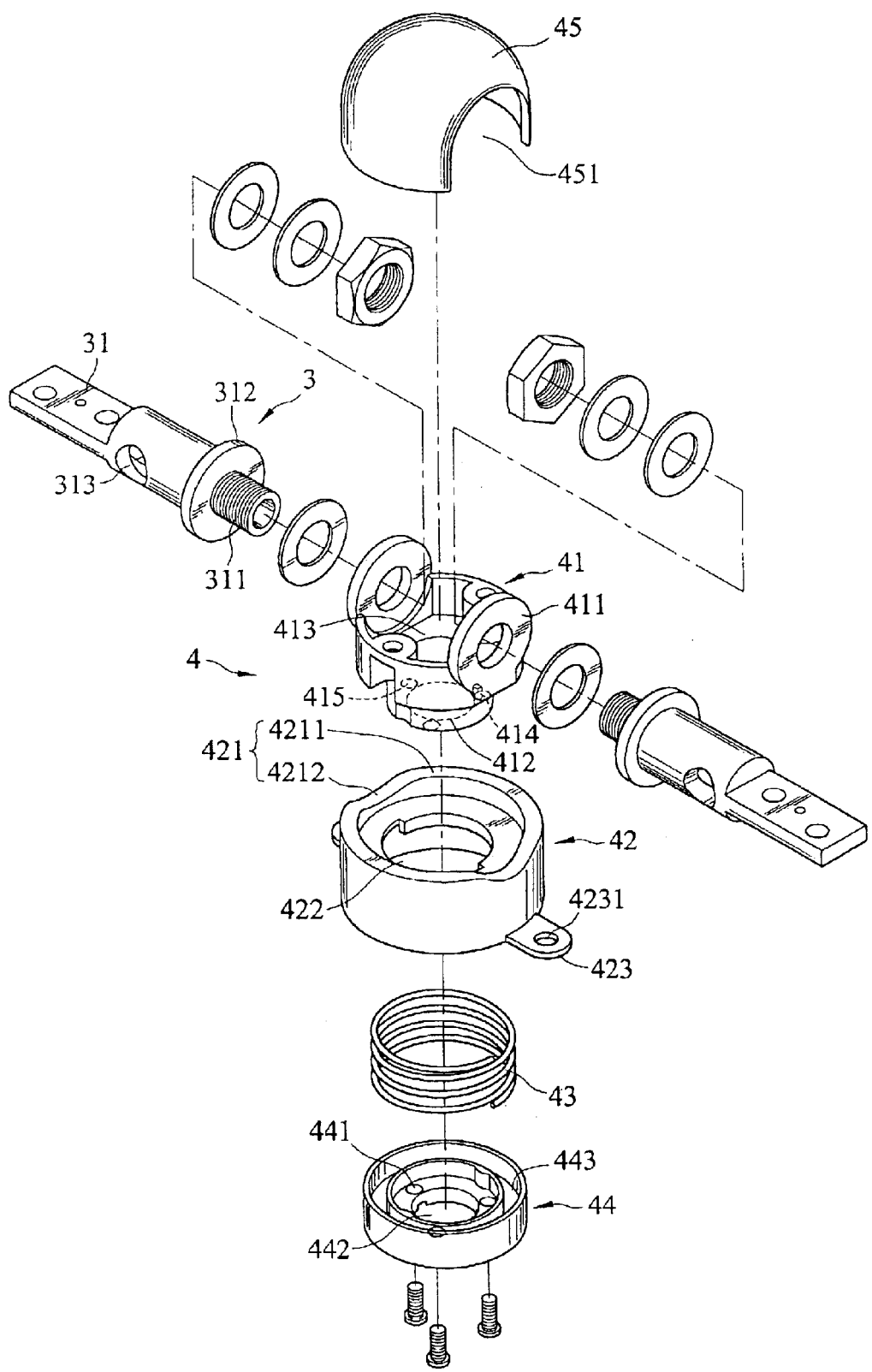
FIG. 3 is a magnified view of the invention.
Figure 4:
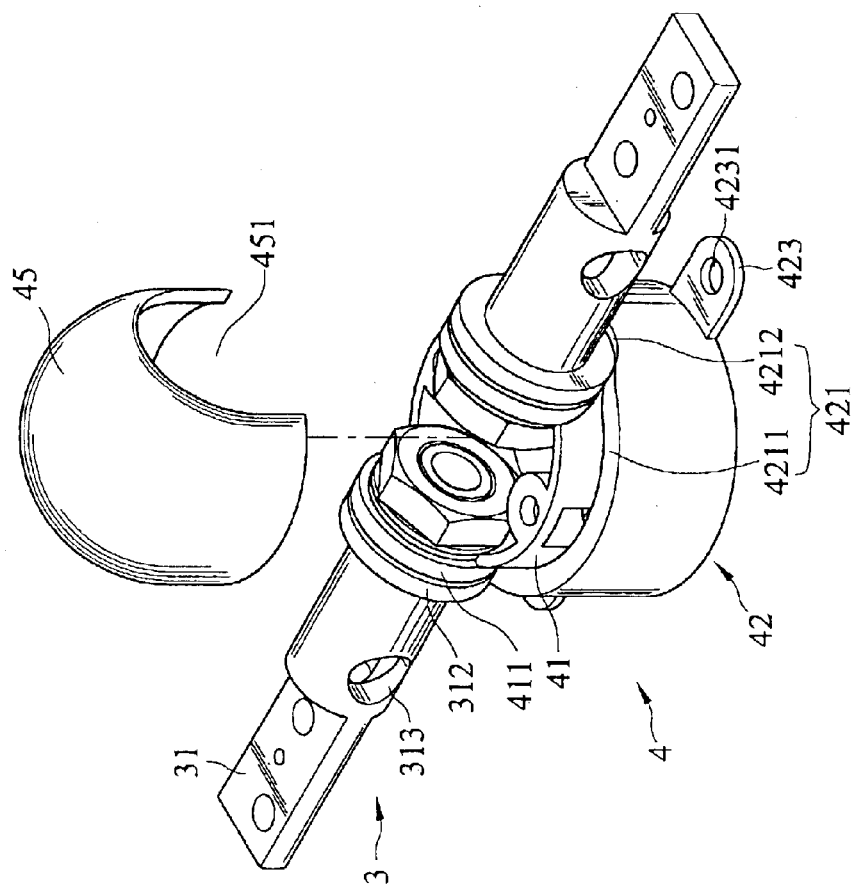
FIG. 4 is a fragmentary perspective view of the invention.

Referring to FIGS. 3, 4, 5, 7A and 8, the swivel axle structure of the invention is on a portable computer that consists of a display device 1 and a main body 2. The swivel axle structure includes a pivotal shaft 3 turnable to a first axis and a swivel apparatus 4 swivelable to a second axis.

The pivotal shaft 3 is located on the display device 1. It includes two shafts 31. Each has one end formed screw threads 311 and a leaning element (leaning section) 312 adjacent to one end of the screw threads 311. The shafts 31 are hollow and each has an opening 313 formed on the side leading to the hollow interior.

The swivel apparatus 4 is located on the main body 2 and includes a first member 41, a second member 42, an elastic element 43, a third member 44 and a protection cap 45.

The first member 41 includes two symmetrical lugs 411, a strut 412, a axle hole 413, a retaining element 414 and screw holes 415. The lugs 411 are located on one end of the first member 41 to allow the shafts 31 of the pivotal shaft 3 to run through. The strut 412 is located on another end of the first member 41. The axle hole 413 runs through the first member 41. The retaining element 414 and screw holes 415 are also located on another end of the first member 41.

The second member 42 is located on the main body 2 and is coupled on the strut 412. It has a swivel edge 421 on one end. The swivel edge 421 corresponds to the leaning elements 312 and has two indented notches 4211 and a sloped element (lifting path) 4212. The second member 42 further has a axle hole 422 and two anchor elements 423 extending from two sides thereof. The axle hole 422 is coupled on the strut 412 and formed by two semi-circular holes of different diameters to allow the retaining element 414 to turn only in the semi-circular hole of a larger diameter. Each anchor element 423 has a hole 4231 to receive a screw for fastening the second member 42 to the main body 2.

The elastic element 43 is a spring for coupling on the strut 412 and has one end connected to the second member 42.

The third member 44 has a axle hole 442 for coupling with the strut 412 and a plurality of apertures 441 corresponding to the screw holes 415 of the first member 41 to receive screws for fastening the third member 44 to the first member 41. The third member 44 further has an annular groove 443 to hold another end of the elastic element 43.

The protection cap 45 is located above the first member 41 to cover the elements of the swivel apparatus 4 installed on the main body 2 to protect the elements from being damaged during use. The protection cap 45 has openings 451 corresponding to the shafts 31 to allow the shaft 31 to pass through when the protection cap 45 is mounted on the first member 41.

For assembly, install the second member 42 on the main body 2. Have the strut 412 of the first member 41 running through the axle hole 422 of the second member 42 to couple with the elastic element 43. Next, have the strut 412 running though the axle hole 442 of the third member 44. Fasten the third member 44 to the first member 41 by means of screws, and have the screw thread end of the shaft 31 of the pivotal shaft 3 running through the lug 411 to make the leaning element 312 corresponding to the swivel edge 421. Fasten the shaft 31 by means of a nut. Mount the protection cap 45 on the first member 41 with the opening 451 coupling with the shaft 31. Then the display device 1 may be swiveled relative to the main body 2. As the shaft 31 of the pivotal shaft 3 is hollow, and various elements of the swivel apparatus 4 have axleholes (413, 422 and 442) related to each other, the cables linking the display device 1 and the main body 2 may be threaded through therein.

Figure 5:
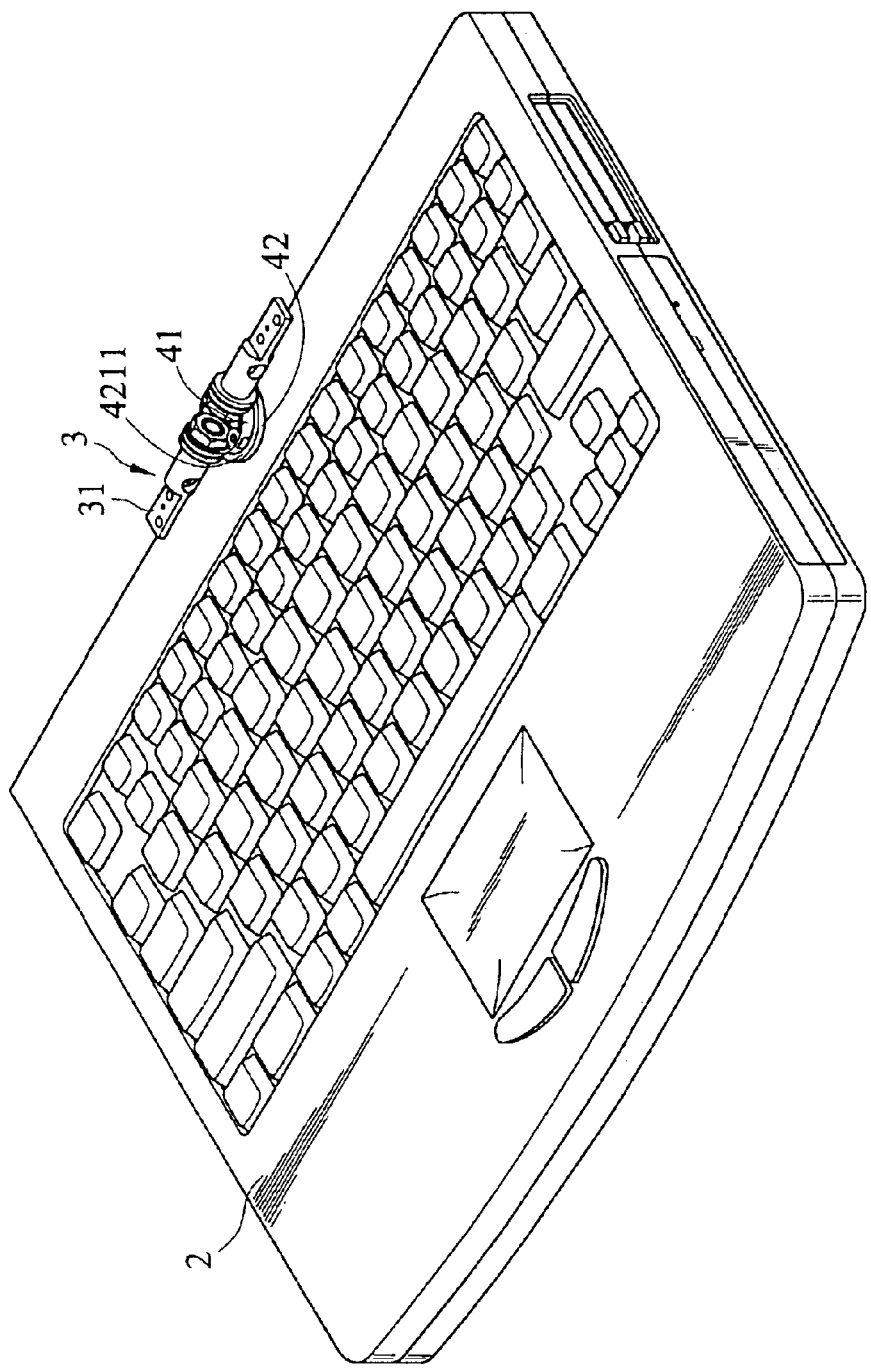
FIG. 5 is a schematic view of the invention on a portable computer, with the protection cap detached.
Figure 6:
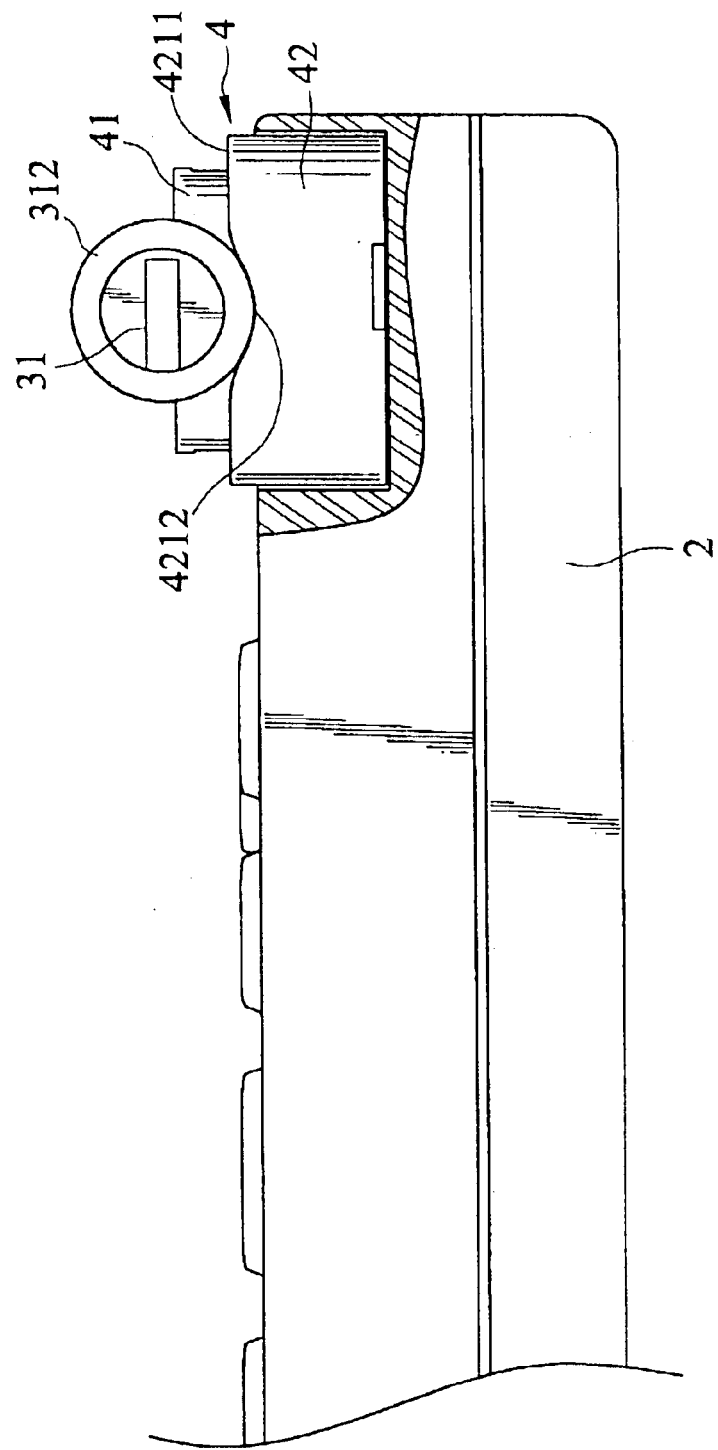
FIG. 6 is a schematic view of the invention on a portable computer with the leaning element connected to the indented notch.
Figure 7A:
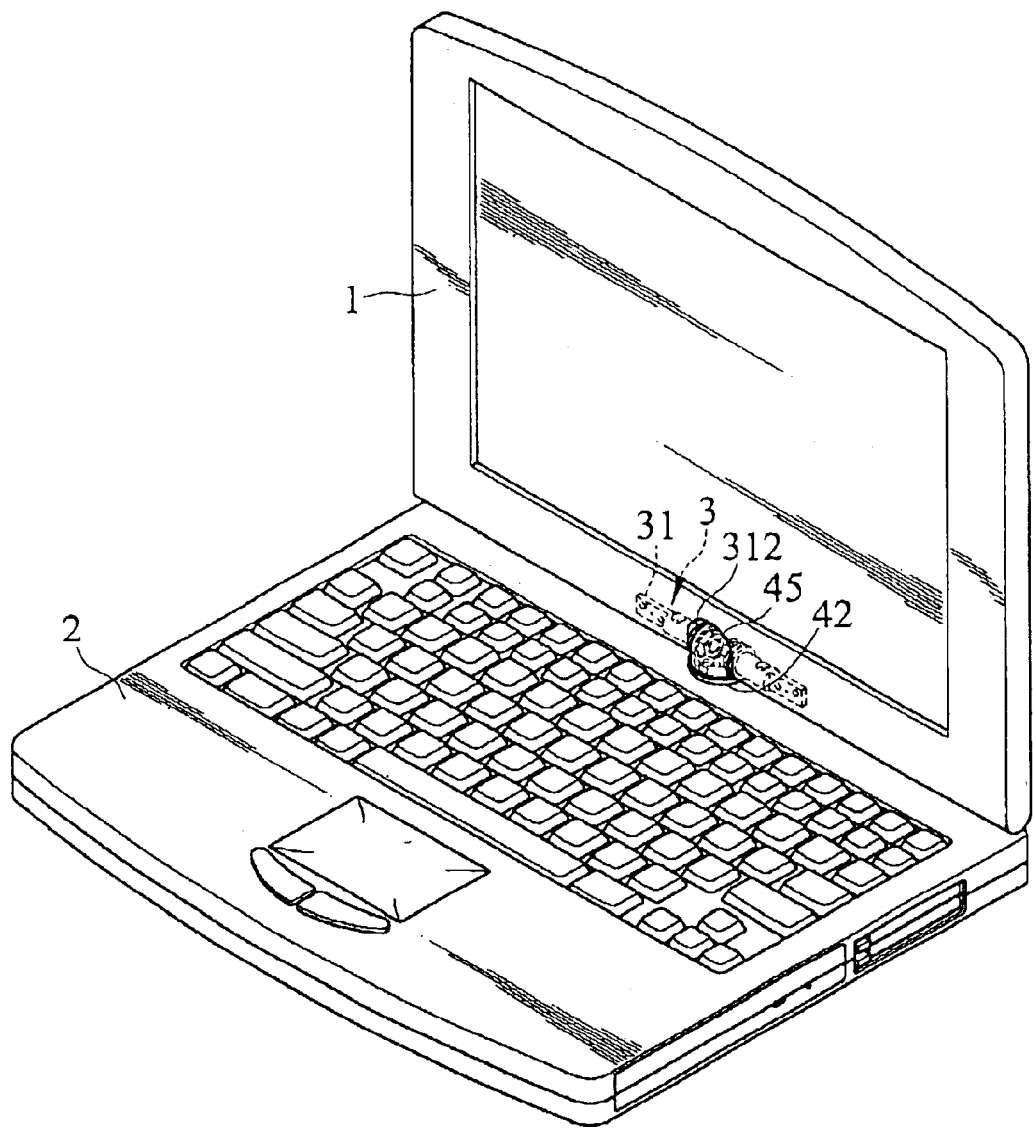
FIGS. 7A, 7B and 7C are schematic views of the invention, showing the display device being swiveled relative to the main body in various conditions.
Figure 7B:
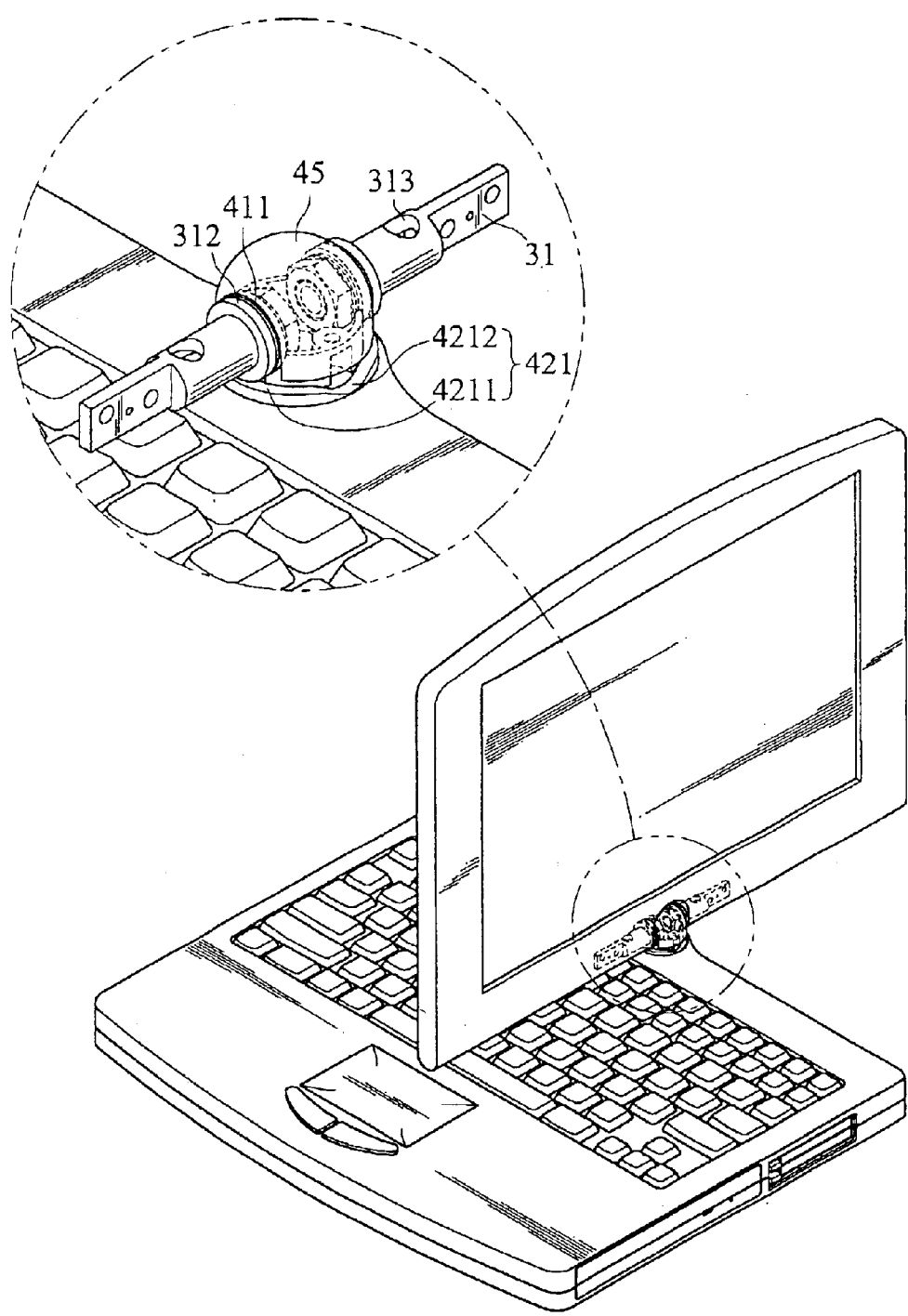
Figure 7C:
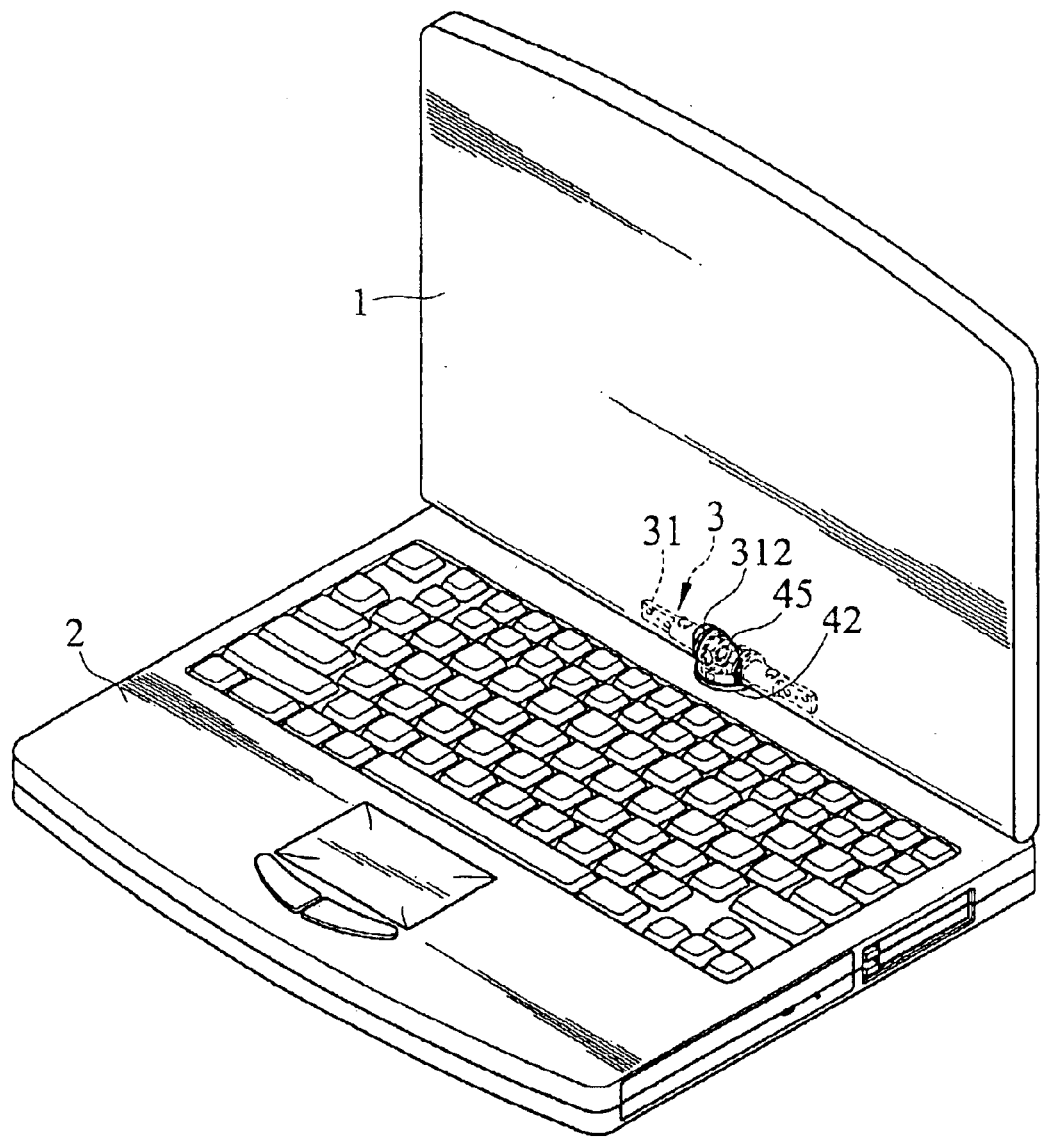
Figure 8:
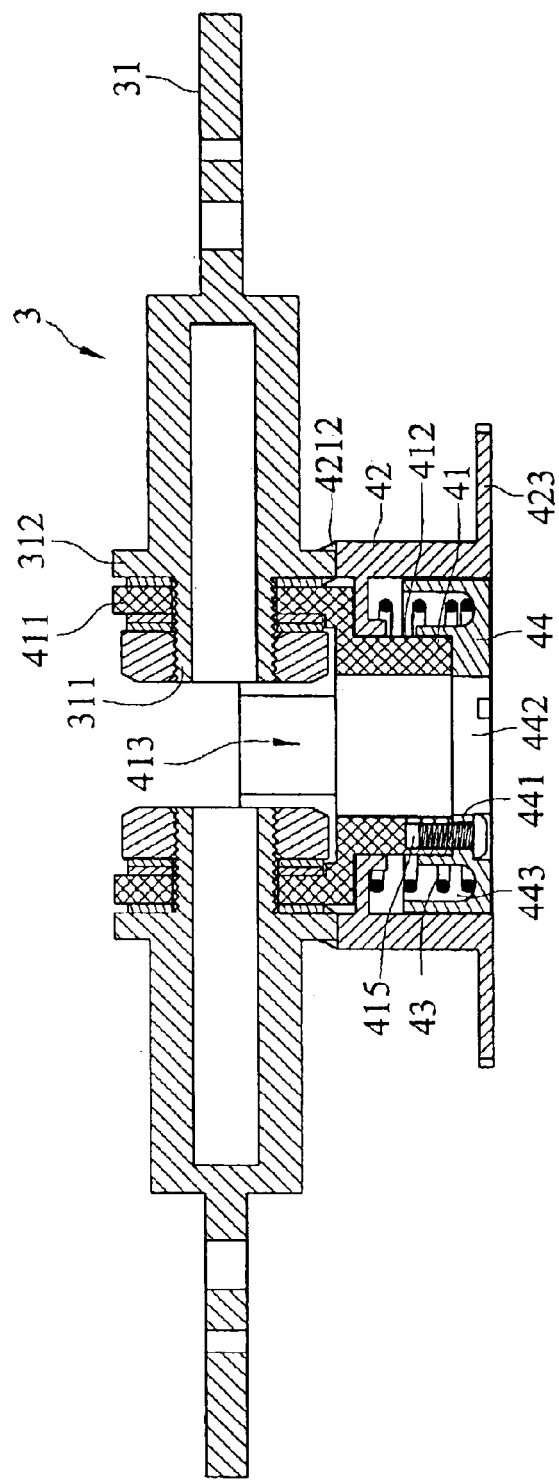
FIG. 8 is a fragmentary sectional view of the invention.

Referring to FIGS. 5 through 7C, when in use, first lift and open the display device 1 from the main body 2. The leaning elements 312 turn in the indented notch 4211 (as shown in FIGS. 5, 6 and 7A, at the position where the aperture 313 of the pivotal shaft 3 faces). When the display device 1 is swiveled relative to the main body 2, the leaning element 312 moves along the indented notch 4211 and is lifted to the sloped element 4212 and escapes the indented notch 4211, and finally falls in the indented notch 4211 again (referring to FIGS. 7A, 7B and 7C). In the mean time, the fastened first member 41 and the third member 43 also are lifted relative to the second member 42. The elastic element 43 restricts the first member 41 so that the leaning element 312 maintains contact with the swivel edge 421 (not shown in the drawings). Thus when the display device 1 is swiveled, it is lifted away from the main body 2 without loosening. The retaining element 414 is turned only in the semi-circular hole of a larger diameter of the axle hole 422 while the display device 1 is swiveled, thus can limit the swivel angle of the display device 1 to avoid the cable located in the axle holes (413, 422 and 442) from being torn or ruptured.

Of course, the fastening means of screws or nuts for coupling the elements mentioned above may also be substituted by other fastening means such as soldering, bonding or latching.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A rotary axle structure for a portable computer that has a display device pivotally engaged with a main body, comprising:

a plurality of pivotal shafts turnable about a first axis connecting to the display device and having respectively a leaning element; and a swivel apparatus swivelable about a second axis connecting to the main body and having a sloped element;

wherein the leaning element moves on the sloped element when the swivel apparatus swivels about the second axis such that the distance between the leaning element in the direction of the first axis is altered.

2. The rotary axle structure for a portable computer of claim 1, wherein the leaning element is a leaning section.

3. The rotary axle structure for a portable computer of claim 1, wherein the sloped element is a lifting path.

4. The rotary axle structure for a portable computer of claim 1, wherein the swivel apparatus comprises:

a first member which has two lugs and a strut, the lugs being located on one end of the first member to allow the pivotal shafts to run through, the strut being located on another end of the first member;

a second member located on the main body and coupled on the strut having a swivel edge on one end thereof, the swivel edge having an indented notch corresponding to the leaning element, the sloped element being located on the swivel edge;

an elastic element coupling on the strut and having one end in contact with the second member; and a third member coupling on the strut and fastening to the first member and being in contact with another end of the elastic element;

wherein when the display device is lifted and opened relative to the main body, the leaning element turns on the indented notch, when the display device is swiveled, the leaning element is lifted from the indented notch to the sloped element and moved away from the indented notch such that the first member and the third member are lifted relative to the second member with the elastic element retaining the first member to allow the leaning element in contact with the swivel edge thereby the display device is lifted and moved away from the main body during swiveling.

5. The rotary axle structure for a portable computer of claim 4, wherein the pivotal shaft includes two shafts each running through the lug.

6. The rotary axle structure for a portable computer of claim 5, wherein the shaft has one end forming screw threads to engage with a nut for fastening after having run through the lug and with the leaning element corresponding to the swivel edge.

7. The rotary axle structure for a portable computer of claim 5, wherein the shaft is hollow in the interior and has an aperture formed on the side wall leading to the interior, the members of the swivel apparatus having respectively an axle hole communicating with one another for housing cables linking the display device and the main body.

8. The rotary axle structure for a portable computer of claim 4, wherein the two lugs of the first member are symmetrical.

9. The rotary axle structure for a portable computer of claim 4, wherein the second member has two anchor elements extending from two sides thereof, each anchor element having a hole to receive a screw for fastening the second member to the main body.

10. The rotary axle structure for a portable computer of claim 4, wherein the second member has a axle hole for coupling with the strut, the axle hole being formed by two semi-circular holes of different diameters, the first member having a retaining element located on another end turnable only in the semi-circular hole of a larger diameter.

11. The rotary axle structure for a portable computer of claim 4, wherein the third member has an annular groove for holding another end of the elastic element.

12. The rotary axle structure for a portable computer of claim 4, wherein the third member has a plurality of apertures, the first member having a plurality of screw holes corresponding to the apertures to engage with screws for fastening the third member to the first member.

13. The rotary axle structure for a portable computer of claim 4, wherein the elastic element is a spring.

14. The rotary axle structure for a portable computer of claim 4 further having a protection cap located above the first member.

15. The rotary axle structure for a portable computer of claim 14, wherein the protection cap has openings corresponding to the pivotal shafts to allow the pivotal shafts to pass through when the protection cap is mounted on the first member.

* * * * *